United States Patent [19]

Schleicher

[11] 4,133,365
[45] Jan. 9, 1979

[54] OBSTRUCTION SENSING EDGE FOR A BIFOLDING DOOR

[75] Inventor: George W. Schleicher, Addison, Ill.
[73] Assignee: Vapor Corporation, Chicago, Ill.
[21] Appl. No.: 804,710
[22] Filed: Jun. 8, 1977
[51] Int. Cl.² ............................................. E06B 3/48
[52] U.S. Cl. ............................... 160/118; 160/206; 49/28; 200/61.43
[58] Field of Search ................. 49/26, 27, 28, 368; 160/206, 118, 199; 200/61.43, 61.44

[56] References Cited

U.S. PATENT DOCUMENTS

| | | | |
|---|---|---|---|
| 3,260,812 | 7/1966 | Miller | 200/61.43 |
| 3,710,050 | 1/1973 | Richards | 49/28 X |
| 3,919,809 | 11/1975 | Haughton | 49/368 |
| 4,045,631 | 8/1977 | Dann | 200/61.43 |

Primary Examiner—Kenneth Downey
Attorney, Agent, or Firm—Francis J. Lidd

[57] ABSTRACT

An obstruction sensing edge for a bifolding door includes a body secured to the door. The body defines an internal fluid chamber that is in fluid communication with a fluid actuated switch. The switch controls the opening and closing of the door. Defined on the body portion is an edge portion including a leading edge and side portions extending from the leading edge to the body portion. The leading edge and body portion are fabricated of elastomeric material such that upon engagement of the leading edge with an obstruction, the internal chamber is deformed changing the volume thereof and actuating the switch. The edge portion includes elongated fins extending transversely to the sides of the edge portion such that upon complete closing of the door, the fins seal the door.

8 Claims, 4 Drawing Figures

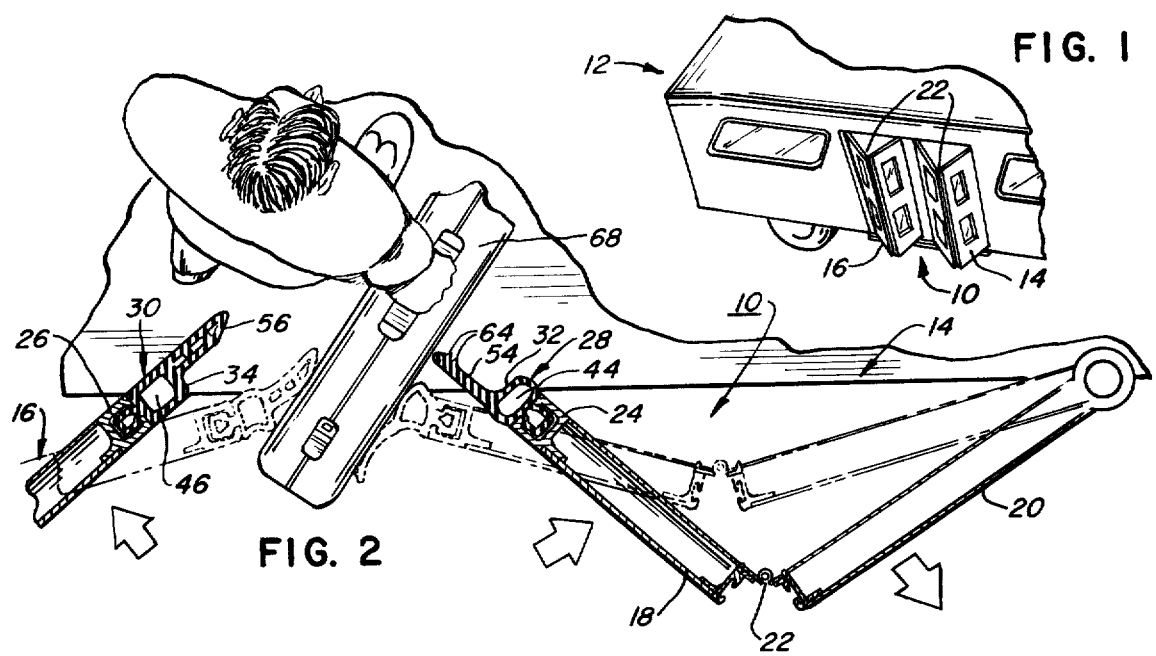
FIG. 1
FIG. 2
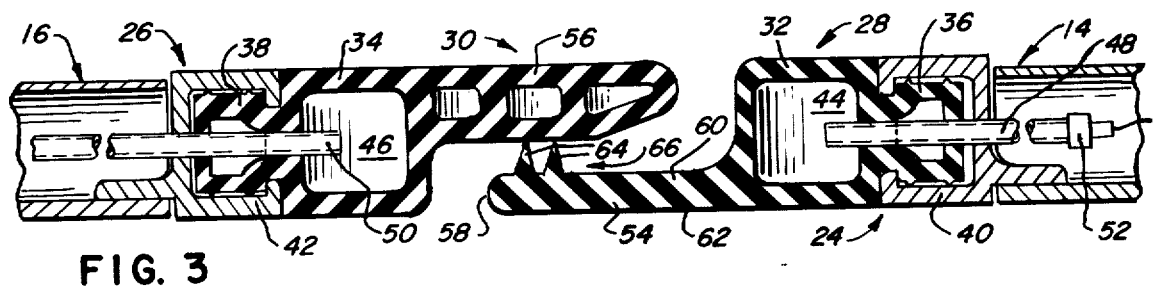
FIG. 3
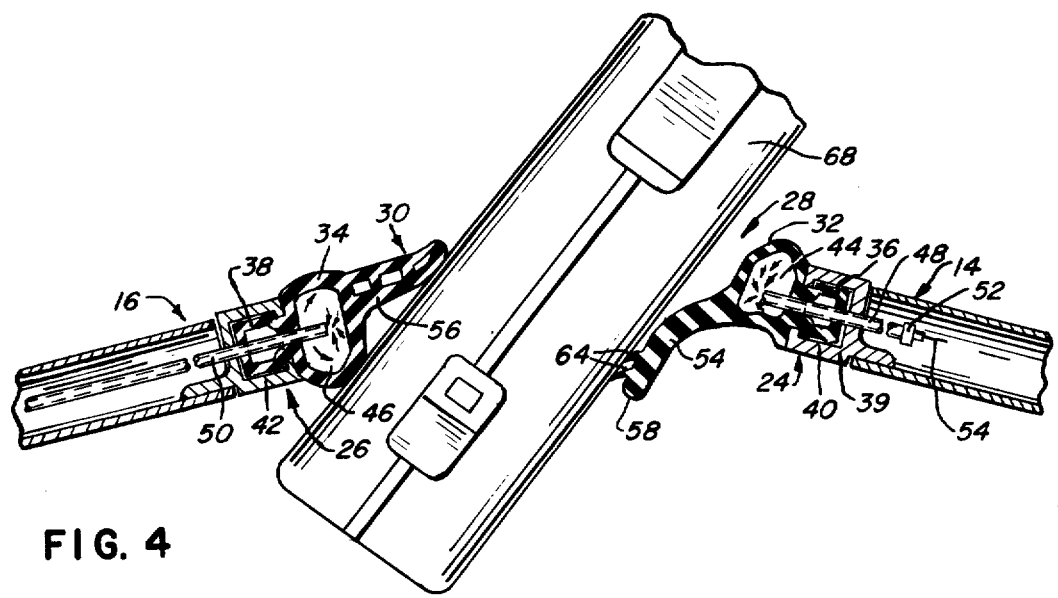
FIG. 4

OBSTRUCTION SENSING EDGE FOR A BIFOLDING DOOR

BACKGROUND OF THE INVENTION

A. Field of the Invention

The present invention relates to a new and improved obstruction sensing edge for bifolding doors.

B. Description of the Prior Art

The current trend in mass transit door systems is to employ a fluid or pneumatically operated obstruction sensing system the leading edge of which is secured to the leading edge of an automatic door. The most popular system is the pneumatic operated sensing arrangement.

Typical arrangements employ a soft hollow extruded rubber or other elastomeric edge that is air tight except for a sensing tube extending from the hollow interior of the edge to a remotely located pressure switch. The chamber in the sensing edge is large relative to the pressure chamber in the pressure switch such that the switch is highly sensitive to changes in the shape of the leading edge. For example, if an arm were engaged by the sensing edge, the change in configuration of the chamber in the edge would send a pressure pulse through the sensing tube that is sensed in the pressure chamber in the switch. This causes the switch to actuate and recycle the system to open the door.

A significant problem in this type of obstruction sensing arrangement, particularly in bifolding doors, is that since the edges of the bifolding doors meet at the center, it is necessary that the edges engage each other to seal the door upon being closed. As the edges engage each other upon closure, a slight deformation in the chamber of the edge results in a signal to the pressure switch causing a recycling of the door. In some prior art systems this problem is overcome by detecting the location of the door and employing limit switches that parallel or cut out the recycling feature of the pressure switch. This creates the additional problem that the doors will engage an obstruction subsequent to passing the limit switch thus not recycling creating a dangerous situation.

SUMMARY OF THE INVENTION

An object of the present invention is to provide a new and improved obstruction sensing edge for an automatic door.

An additional object of the present invention is to provide a new and improved obstruction sensing edge for bifolding doors of the type employed in mass transit door systems.

A further object of the present invention is to provide an obstruction sensing edge for a door that remains sensitive throughout the door operating cycle.

Briefly, the present invention is directed to an obstruction sensing edge for doors used in mass transit door systems. The edge includes a body fabricated from elastomeric material that is secured to the leading edge of the door. The body defines an internal, hollow, fluid chamber that is in fluid communication with a pressure operated switch located at a remote location from the door.

Secured to the body portion is a leading edge portion that is made of deformable elastomeric material and includes a leading edge and a side portion extending from the leading edge to the body portion. The side portions extend in a plane substantially parallel to the plane of the door.

The door, upon being closed, is sealed in the closed position by at least one sealing fin that extends transverse to the side of the leading edge portion. In this manner the leading edge of the obstruction sensing edge does not engage the corresponding edge of another door or the door jamb. Consequently, the pressure operated switch may be operative during the entire cycle of the door opening and closing without the necessity of limit switches.

BRIEF DESCRIPTION OF THE DRAWING

The above and other objects and advantages and novel features of the present invention will become apparent from the following detailed description of the preferred embodiment of the invention illustrated in the accompanying drawing, wherein:

FIG. 1 is a perspective view of a transit vehicle including a door constructed in accordance with the priciples of the present invention;

FIG. 2 is a top elevational view of the door;

FIG. 3 is a cross-sectional view of the sensing edges of the door illustrated in FIG. 2; and FIG. 4 is a view similar to FIG. 3 with an obstruction between the sensing edge.

DESCRIPTION OF THE PREFERRED EMBODIMENT

Having reference now to the drawings, there is illustrated a bifolding door generally designated by the reference numeral 10 and of the type that may be used in the rear doors of transit vehicles such as the transit vehicle generally designated by the reference numeral 12. Bifolding doors of the type illustrated include first 14 and second 16 door sections and each section 14 and 16 includes two door panels, for example, the door portion 14 includes door panels 18 and 20. These panels are hingedly connected at a hinge 22. In this manner, the door 10 is opened by folding the door portions 14 and 16 along the hinge 22 in a manner illustrated in FIGS. 1 and 2.

The bifolding door 10 upon complete closure requires a sealing engagement of the leading edges 24 and 26 of the door portions 14 and 16, respectively, to seal the inside of the vehicle 12 from the weather. In addition, it is also necessary that the door 10 include obstruction sensing edges such as the edges generally designated by the reference numerals 28 and 30 secured to the leading edges 24 and 26 to sense the presence of an obstruction and to open the door 10 preventing capturing of the obstruction between the leading edges 24 and 26. To accomplish this sensing function the obstruction sensing edges 28 and 30 each includes a body 32 and 34, respectively, fabricated from an elastomer or similar material that will deform a desired amount upon engagement with an obstruction.

The bodies 32 and 34 each include a retaining section or portion 36 and 38 that is adapted to fit within a corresponding retaining channel 40 and 42 secured to the leading edges 24 and 26, respectively. In addition, the bodies 32 and 34 each define an internal fluid chamber 44 and 46, respectively. The fluid chambers 44 and 46 are completely enclosed except for sensing tubes 48 and 50 that extend into the chambers 44 and 46, respectively. These sensing tubes 48 and 50 are in fluid communication with a fluid actuated switch 52.

The fluid chambers 44 and 46 are filled with fluid. In the preferred embodiment the fluid is air. Consequently, if one or both of the chambers 44 or 46 are deformed as a result of engagement with an obstruction during operation of the door 10, this deformation causes a pressure change within the chambers 44 and 46. This pressure change is sensed by the fluid actuated switch 52 through its communication with the chambers 44 and 46 by the tubes 48 and 50 and is actuated. The switch 52 is connected by a lead wire 54 to an electrical circuit of a type well known in the prior art. This circuit (not shown) once actuated by the switch 52, recycles the door 10 causing the door 10 to open allowing removal of the obstruction.

To overcome the problem in the prior art of the switch 52 recycling the door 10 due to the engagement of the obstruction sensing edges 28 and 30 and to provide a seal between the door portions 14 and 16 upon complete closure of the door 10, the body portions 32 and 34 each includes an elongated leading edge portion 54 and 56. The leading edge portions 54 and 56 are integrally defined on the body portions 32 and 34 and are fabricated from the same resilient material. Consequently, engagement of the leading edge portions 54 and 56 with an obstruction will result in deflection of these portions 54 and 56 and deformation of the body portions 32 and 34 producing the desired pressure change within the chambers 44 and 46. This action results in a recycling of the door 10. Although the leading edge portions 54 and 56 allow recycling upon engagement with an obstruction, they do not engage each other upon complete closure of the door 10 thus preventing inadvertent recycling upon complete closure. To obtain this result the leading edge portion 54 includes a leading edge 58 and side portions 60 and 62 extending away from the leading edge 58 to the body portion 32. Extending from the side 60 is at least one sealing fin 64. In the preferred embodiment there are two sealing fins 64 that extend transversely to the leading edge portion 54 in a direction toward the leading edge portion 56 upon closure of the door 10. The sealing fins 64 extend the full heighth of the door portions 14 and 16 along the leading edge portion 54.

As illustrated in FIG. 3 the leading portions 54 and 56 extend from opposite sides of the body portions 32 and 34 and are of a configuration such that there is a defined space or a gap 66 between the leading edge portions 54 and 56 upon complete closure of the door 10. The width or transverse dimension of the sealing fins 64 is such that it is approximately equal to the gap 66. In this manner, upon complete closure of the door 10 the ends of the sealing fins 64 engage the leading edge portion 56 providing a seal along the full length or heighth of the door portions 14 and 16. In addition, due to the resiliency of the material from which the sensing edges 28 and 30 are fabricated, slight engagement of the sealing fins 64 with the leading edge portion 56 may occur without significant deformation of the chambers 44 and 46 thus avoiding recycling of the door 10.

In operation of the door 10, the door portion 14 is timed to extend its full length to the closed position prior to the door portion 16 such that the leading edge portion 54 is behind the leading edge portion 56 as illustrated in FIG. 3. If, during the closing of the door 10 there is an obstruction in the path of the door 10 such as the suitcase 68 (FIGS. 2 and 4), the leading edge portions 54 and 56 will engage the obstruction 68 deforming in a manner so as to deform the chambers 44 and 46. Deformation of the chambers 44 and 46 results in a volume and thus a pressure change that is communicated through the sensing tubes 48 and 50 to the switch 52 causing a recycling and thus an opening of the door 10 to allow removal of the obstruction.

If, however, the obstruction sensing edges 28 and 30 do not engage an obstruction during closing of the door, the door 10 will completely close and be sealed (FIG. 3) without the engagement of the leading edge portions 54 and 56 that would recycle the door 10. Consequently, limit switches to turn off the switch 52 just prior to the closing of the door 10 are not necessary and the sensing edges 28 and 30 are operational throughout the entire operative cycle of the door 10.

While the invention has been described with reference to details of the illustrated embodiment, it should be understood that such details are not intended to limit the scope of the invention as defined in the following claims.

What is claimed and desired to be secured by Letters Patent of the United States is:

1. A fluid pressure sensitive edge assembly for an electrically operated door comprising:
   a channel portion for securement to said door;
   a first hollow body portion adjacent said channel portion defining an enclosed fluid chamber including fluid therein;
   a first edge member defined on said first body portion and extending therefrom substantially along the plane defined by said door; a second hollow body portion defining a second enclosed fluid chamber, a second edge member defined on said second body portion extending along said plane, and fluid actuated switch means for opening said door upon engagement of one of said first and second edge members with an obstruction during the operating cycle of said door causing deformation of one of said first and second fluid chambers and means for communicating said fluid chambers to said switch, said second edge member adapted to be positioned adjacent and overlapping said first edge member upon said door being closed;
   one of said first and second edge members including at least one rib member extending transverse to said one of said first and second edge members and abutting said other of said first and second edge members upon closure of said door thereby providing a seal between said first and second edge members.

2. The fluid pressure sensitive edge assembly claimed in claim 1 wherein said body portion and said first and second edge members are fabricated of resilient elastomeric material.

3. The fluid pressure sensitive edge assembly claimed in claim 1 wherein said door comprises a bifolding door including first and second folding doors, said first edge member being secured to said first door and said second edge member being secured to said second door.

4. The sensor claimed in claim 3 further comprising second means for communicating said second fluid chamber with said fluid actuated switch means.

5. An obstruction sensor for an automatic door that remains sensitive to obstruction throughout the door closing operation comprising:
   a deformable body portion fabricated of resilient material secured to said door, said body portion defining an interior fluid chamber;

said body portion including an edge member defined by a leading edge and said members extending from said leading edge to said body portion, said side members being in a plane substantially parallel to the plane defined by said door, said edge member being deformable upon engagement of said leading edge with an obstruction during closing of said door to change the volume of said fluid chamber; fluid operated switch means for controlling the operation of said door and means for communicating said switch means with said fluid chamber, and means secured to said edge member and extending transverse to at least one of said side members for sealing said door in the closed position upon overlapping of said edge member with a portion of said door, said sealing means being sufficiently resilient that upon engagement with an obstruction will not change the volume of said chamber during closing of said door.

6. The sensor claimed in claim 5 wherein said sealing means comprises at least one elastomeric fin extending the length of said body portion.

7. The sensor claimed in claim 5 wherein said door comprises a bifolding door including first and second door portions, said body portion secured to said first door portion; and a second body portion secured to said second door portion, said second body portion including an edge member defined by a leading edge and side members extending from said leading edge to said second body portion, said side members lying in a plane substantially parallel to the plane defined by said second door portion, said second body portion defining a second interior fluid chamber.

8. An obstruction sensing edge assembly for a bifolding door including first and second door portions comprising:

a first deformable obstruction sensing edge member secured to the leading edge of said first door portion;

said first deformable edge member fabricated of a resilient material including a body, said body defining an internal fluid chamber;

said first edge member further including a leading edge portion defined on said body, said leading edge portion extending from said body along a plane substantially parallel to said first door portion;

a second deformable obstruction sensing edge member secured to the leading edge of said second door portion;

said second deformable edge member fabricated of a resilient material including a body, said body defining an internal fluid chamber;

said second edge member further including a leading edge portion defined on said body, said leading edge portion extending from said body along a plane substantially parallel to said second door portion; fluid operated switch means for controlling the operating cycle of said door and a fluid conduit communicating said switch means with said chambers of said first and second edge members such that upon contact of said leading edge portions with an object, one of said fluid chambers is deformed changing the volume of said fluid chamber and actuating said switch means; and at least one sealing fin defined on one of said first and second edge members, said fin extending transversely to said leading edge portion of said one of said first and second deformable edge members, said leading edges of portions of said first and second deformable edges overlapping and said fin engaging the other of said one of said first and second deformable edge members upon said door being closed.

* * * * *